United States Patent [19]
Lichfield

[11] Patent Number: 4,541,568
[45] Date of Patent: Sep. 17, 1985

[54] SAFETY SPRAY WAND
[76] Inventor: William H. Lichfield, Box 112, Corinne, Utah 84307
[21] Appl. No.: 453,588
[22] Filed: Dec. 27, 1982
[51] Int. Cl.⁴ ............................................. B05B 9/01
[52] U.S. Cl. ................................... 239/441; 239/449; 239/526
[58] Field of Search ............. 239/441, 438, 439, 440, 239/447, 448, 449, 526, 443; 403/59, 189

[56] References Cited
U.S. PATENT DOCUMENTS

| | | | |
|---|---|---|---|
| 2,567,176 | 9/1951 | Ballard | 239/526 X |
| 3,111,273 | 2/1962 | Mei | 239/447 |
| 3,672,575 | 6/1972 | Hinrichs | 239/447 X |
| 3,844,487 | 10/1974 | Malec | 239/526 |
| 3,941,523 | 3/1976 | Shin et al. | 227/59 X |
| 4,095,747 | 6/1978 | Anderson | 239/443 X |

Primary Examiner—Andres Kashnikow
Assistant Examiner—Kevin Patrick Weldon
Attorney, Agent, or Firm—B. Deon Criddle

[57] ABSTRACT

A safety spray wand with a selectively adjustable or interchangeable tip. The wand will selectively provide a high pressure or a low pressure discharge from a discharge tube. The wand has a handle with a pistol grip in combination with a large squeeze trigger. The pistol grip is extended and is molded around a receiving tube that projects downwardly from a discharge tube to thereby form a safety protection guard for an operator's hand while protecting the trigger from accidently being actuated. The receiving tube not only serves as a guard but also as a conduit to which a pressure source is attached and through which the fluid is directed to the discharge tube.

10 Claims, 2 Drawing Figures

SAFETY SPRAY WAND

BACKGROUND OF THE INVENTION

Field of the Invention

This invention relates to spray wands for hand held operation that will provide a high pressure discharge from a nozzle.

BRIEF DESCRIPTION OF THE INVENTION

Prior Art

The use of hand held spray wands to direct a high pressure spray of water or other cleaning fluid has long been known. Such wands are commonly used, for example in conjunction with car wash operations and with steam cleaners and the like.

It has been found that the known spray wands are sometimes dangerous to a user when liquids are being delivered at high pressures through the wands. If the control valve regulating flow through such a wand remains open when the wand handle is released by the user a jet action may occur to whip the wand dangerously around and if the valve is closed the pressure accumulation in the wand may cause cavitation of the pumps supplying liquid under pressure to the wands. Uncontrolled movement of the wand can be dangerous to persons and structures in the vicinity and cavitation may rapidly destroy the pumps. Prior known wands have also been uneccessarily expensive as a result of the many components used and have been easily destroyed by vandals because they are readily disassembled.

Objects of the Invention

Principal objects of the invention are to provide a spray wand that is rugged, durable, not easily vandalized and that can be safely used without the danger of whipping of the wand when it is released or pressure accumulations that will damage supply pumps.

Other objects are to provide a safety wand having a nozzle that will provide a desired spray pattern.

Principal Features of the Invention

Principal features of the invention include a two piece molded and bonded handle incorporating a supply tube and receiving a discharge tube, a valve head arranged to seat against and to close a discharge end of the discharge tube, a high pressure discharge passage through the valve head and a low pressure discharge passage through and around the valve head. The valve head is attached to an operating rod and is closed, leaving a high pressure discharge opening, by pulling on a trigger. Fluid pressure in the discharge tube will open the valve so that a safe, low pressure discharge will occur. The low pressure discharge pressure, while low enough to be safe for use is high enough to maintain a discharge pressure on the supply pump that will prevent pump cavitation.

THE DRAWING

In the Drawing:

FIG. 1 is a perspective view of the wand viewed from a discharge end, with an attached high pressure hose shown fragmentarily; and FIG. 2 a section through the wand taken on the line 2—2 of FIG. 1.

DETAILED DESCRIPTION

Figure 1:
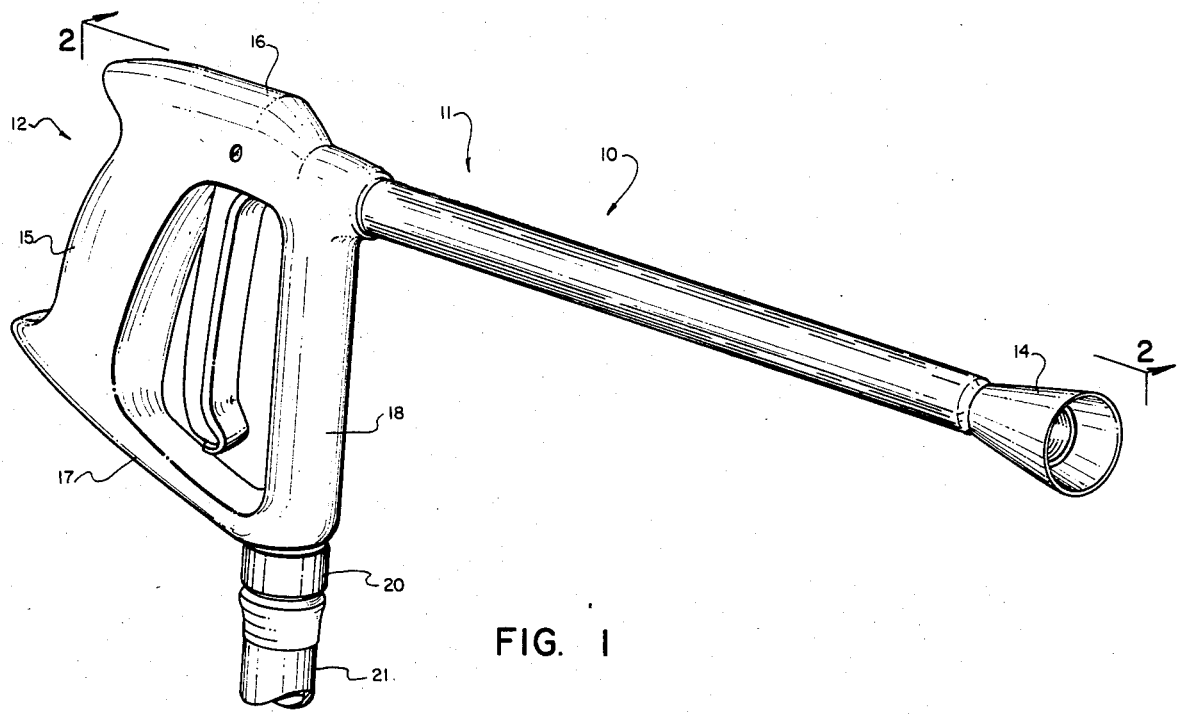
Figure 2:
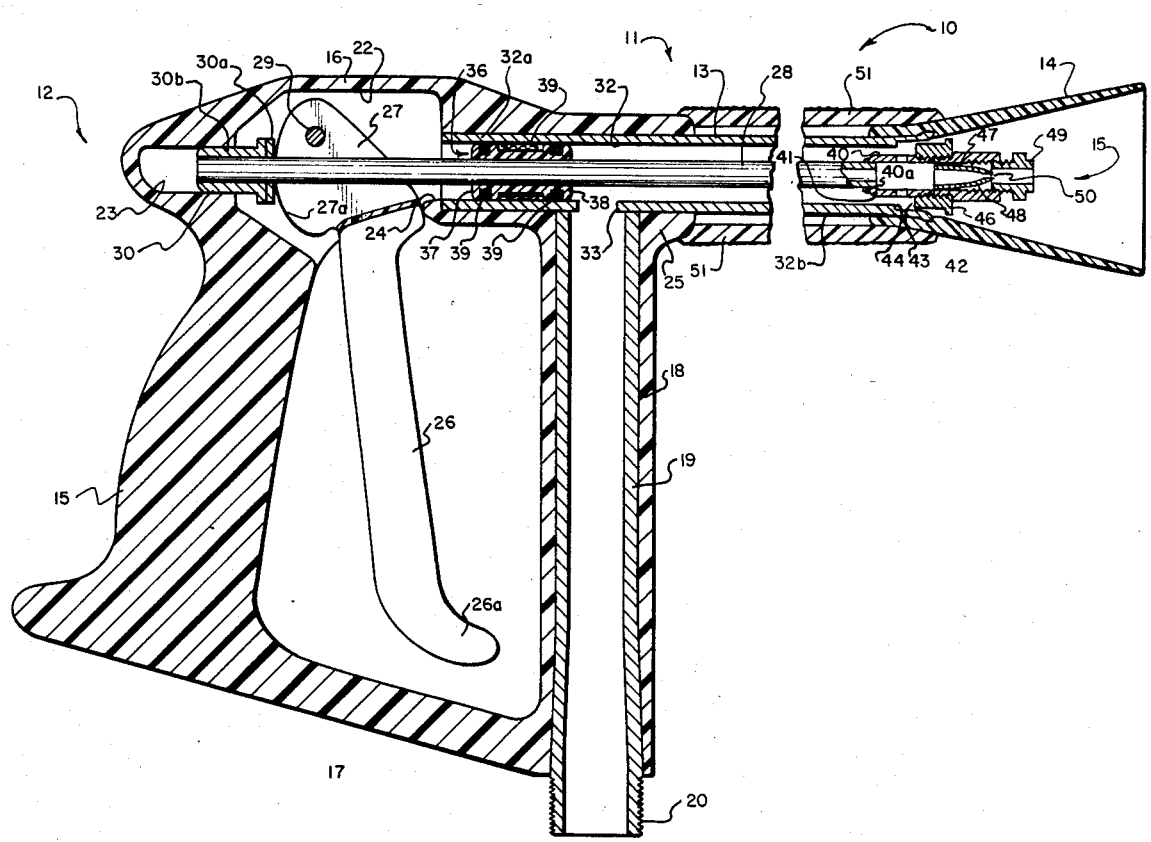

Refering now to the drawings:

In the illustrated preferred embodiment the safety wand shown generally at 10 includes a discharge portion 11 and a handle portion 12. The discharge portion includes a discharge tube 13 with a flexible, soft tip 14 on a discharge end thereof to surround and protect a nozzle 15 and objects contacted by the tip. The handle portion 12 is made up of two molded halves bonded together and includes a molded pistol grip 15 which has a contiguously molded top bridge 16 that extends forwardly to receive the discharge tube 13 and a contiguously molded base bridge 17 that also extends forwardly from the piston grip 15 to a contiguously molded receiving tube cover 18 that extends between the tip bridge 16 and the base bridge 17 a spaced distance from the pistol grip 15.

The receiving tube cover 18 surrounds a receiving tube 19 and preferably is one continuous part with top bridge 16 pistol grip 15 and base bridge 17 while forming handle portion 12. A hose coupler 20 is attached to a threaded end 19a of receiving tube 19 that projects from the receiving tube cover 18 whereby the coupler may be attached to a pressure hose 21, shown fragmentarily.

A cavity 22 is formed in the top bridge 16 and a bore 23 extends from cavity 22 opposite another bore 24 that extends across, intersects and opens into the receiving tube 19. The top bridge 16 extends beyond the receiving tube cover 18 to form a boss 25.

A trigger 26 has a depending end 26a shaped to receive a user's fingers as the pistol grip 15 is grasped. The other end of trigger 26 is formed as a bifurcated cam 27 that straddles an operating shaft 28. A roll pin 29 extends through the cavity 22, with its ends frictionally and mechanically held in opposite walls of the top bridge 16. The cam 27 is pivoted on the roll pin 29 such that the lobe 27a of the cam will swing into engagement with a reactor 30 on the end of shaft 28 when the trigger 26 is pulled toward pistol grip 15.

Reactor member 30 has a head 30a that is contacted by cam 27 and a shank 30b that is of square cross-sectional configuration and that slides without rotating snugly within the bore 23, which has a similar cross sectional configuration. The reactor member 30 is fixed to the end of operating shaft 28 and is movable longitudinally with the shaft.

A tube 32, has one end 32a extending into bore 24 and the other end 32b projecting therefrom. A hole 33 in tube 32 is aligned with one end of receiving tube 19 through which water under pressure is supplied to the wand 10.

A seal assembly 36 is carried by operating shaft 28 and travels inside tube 32 between the hole 33 and the cavity 21 during movement of the operating shaft 28. The seal assembly 36 includes a pair of spaced apart lands 37 and 38, each having an O-ring seal 39 in a surrounding groove. The O-rings are in sealing engagement with the interior of tube 32 and the space between the O-rings and lands is filled with oil 39 to provide further sealing and easier movement of the operating shaft 28.

The end of shaft 28 opposite reactor member 30 has a sleeve 40 welded thereon at 40a. The sleeve has ports 41 through its wall adjacent to the end of shaft 28 in tube 13 and the sleeve extends from tube 13 into the tip 14.

A valve head 42 is fitted onto the sleeve 40 and includes a beveled leading edge 43 that will seat against a shoulder 44 formed in the end 45 of the wall of sleeve 40. A flange 46 around the valve head seats against the inner surface of tip 14 at the same time edge 43 seats against shoulder 44 to provide a double sealing action.

A pair of orifice members 47 and 48 are positioned in face to face relationship within the valve head 42 and are held in place against the end of sleeve 40 by an insert member 49 threaded into the valve member. As the insert member 49 is threaded into the sleeve 40 it squeezes the orifice members together to reduce the orifice opening 50 formed between them. Thus positioning of the insert will determine the discharge pattern through the orifice.

A protective housing 51 extends between boss 25 and the flared tip 14, is spaced from the tube 13 and surrounds the protion of the tube between the boss 25 and tip 14. Housing 51 is preferably made of a durable plastic and maybe fluted to provided additional strength. The housing 51 will prevent bending and other damage to the tube 13 and shaft 28 even if the wand is run over by a vehicle, or the like.

With the wand 10 of the present invention water, under pressure, entering through tube 20 will be discharged at a safe low pressure between tip 14 and valve 42 and through port 41 and the orifice 50 whenever the valve 42 is in its open position, i.e. edge 43 and flange 46 are not in sealing engagement. When the valve 42 is closed and edge 43 and flange 46 are in sealing engagement a high pressure discharge through port 41 and orifice 50 results. The high pressure discharge can then be readily used for cleaning purposes, or the like.

The valve 42 is closed by a user pulling on trigger 26 and is opened by water pressure when the trigger is released. It should be noted that the surface area subjected to water pressure provided by valve 42 is slightly greater than that provided by land 38 so that when the trigger is released the valve 42 will be opened by the water pressure.

In the present invention only a single seal is required and that not only provides for sealing but also for lubrication of the movable shaft.

In the event of wear between the valve 42 and tube 13, or cam 27 and reactor member 30, one or more washers (not shown) can be inserted between the reactor member and the cam. Also, one or more of the washers, of desired thickness can be used to regulate the extent of opening of valve 42 to thereby control the back pressure applied to the supply pump (not shown) to prevent pump cavitation.

The non-circular configuration of reactor member 30 prevents rotation of the shaft 28 to which it is affixed and maintains the orientation of the high pressure discharge through orifice 50.

The invention is a light-weight, easily used, strong and durable wand having few components to wear out and to be replaced. It is easily repaired to compensate for wear, merely by removing pin 29, but is not easily disassembled by unauthorized persons.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A wand for washing vehicles and the like comprising
   a handle having a cavity therein;
   discharge tube means connected into said handle;
   means including a supply tube extending through a receiving cover integral with the handle and intersecting the discharge tube means for supplying fluid under pressure to the discharge tube means;
   valve means including a shaft extending into the cavity and having a reactor member thereon and providing a continuously open, low pressure through the discharge tube means in a released position of the valve and a high pressure flow through the discharge tube means in an actuated position of the valve; and
   means for actuating the valve means including a trigger pivotally connected to the handle and extending into the cavity and a cam on the trigger in engagement with the reactor member on the shaft, whereby pulling on the trigger will move the shaft to actuate the valve means.

2. A wand for washing vehicles and the like comprising
   a handle made of plastic material and having a cavity therein;
   a discharge tube extending from the handle;
   means including a supply tube intersecting the discharge tube for supplying fluid under pressure to the discharge tube;
   seal means in the discharge tube between the cavity and the supply tube;
   valve means providing a continuously open high pressure discharge from said discharge tube and a low pressure discharge from said discharge tube only when the valve means is open, said valve means including a shaft having a reactor member thereon and extending through the discharge tube from the end opposite the handle to the cavity and means operable by pivoting of the trigger to move the shaft and close the valve means; and
   means for opening and closing the valve means, said means including a trigger pivotally connected to the handle and extending into the cavity, and a cam on the trigger in engagement with the reactor member on the shaft.

3. A wand as in claim 2, wherein
   the valve means includes a valve head having an edge thereof engaging a notch formed in the end of the discharge tube opposite to the handle.

4. A wand as in claim 3, wherein
   the discharge tube has a flared tip on the end opposite the handle.

5. A wand as in claim 4, wherein
   the valve head further has a flange therearound to engage the flared tip when the valve means is closed.

6. A wand as in claim 5, wherein
   the seal means in the tube is fixed to and movable with the shaft and includes a pair of spaced apart lands each having an O-ring therearound in sealing engagement with the tube and oil in a reservoer formed between said lands.

7. A wand as in claim 6, including
   an orifice at the end of the tube opposite the handle.

8. A wand as in claim 7, wherein
   the orifice of formed from mating halves and includes a member threaded into the valve head to comprise the mating halves together to provide a desired orifice configuration.

9. A wand as in claim 8, further including
   a protector housing surrounding the discharge tube between the handle and the tip.

10. A wand as in claim 9, wherein
    the handle includes a molded portion surrounding the inlet tube.

* * * * *